US009092185B2

(12) United States Patent
Mizuno et al.

(10) Patent No.: US 9,092,185 B2
(45) Date of Patent: Jul. 28, 2015

(54) DISPLAY TERMINAL PROVIDED WITH AN IMAGE DATA SHARING FUNCTION, IMAGE SHARING SYSTEM AND METHOD FOR SHARING IMAGE DATA

(75) Inventors: Kimiyasu Mizuno, Akishima (JP); Takehiro Aibara, Hamura (JP); Hitoshi Amagai, Fussa (JP); Naotaka Uehara, Higashimurayama (JP); Takayuki Kogane, Akishima (JP); Sumito Shinohara, Akiruno (JP); Masato Nunokawa, Fussa (JP); Tetsuya Handa, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 1338 days.

(21) Appl. No.: 12/893,011

(22) Filed: Sep. 29, 2010

(65) Prior Publication Data
US 2011/0074656 A1   Mar. 31, 2011

(30) Foreign Application Priority Data

Sep. 30, 2009 (JP) ................................. 2009-227942

(51) Int. Cl.
*G09G 5/00* (2006.01)
*G06F 3/14* (2006.01)

(52) U.S. Cl.
CPC .................... *G06F 3/1454* (2013.01)

(58) Field of Classification Search
CPC ........... G01C 21/3644; G01C 21/3647; G01C 21/3655; G06F 17/3087; G06F 17/30265; G06F 21/10; H04M 1/72544; H04M 1/72572; H04M 2250/10; H04W 4/02; H04W 4/20; H04L 67/04; H04L 67/18; H04N 21/41407; H04N 21/4788; H04N 21/8545; H04N 7/17318

USPC .................... 345/1.1–3.4; 709/218, 249, 250; 710/1–125; 707/705
See application file for complete search history.

(56) References Cited

U.S. PATENT DOCUMENTS 6,351,777 B1 * 2/2002 Simonoff ...................... 709/250
8,150,617 B2   4/2012 Manber et al.
(Continued)

FOREIGN PATENT DOCUMENTS

CN         1570665 A      1/2005
CN         1906602 A      1/2007
(Continued)

OTHER PUBLICATIONS

Chinese Office Action dated May 6, 2013 (and English translation thereof) in counterpart Chinese Application No. 201010582714.X.

*Primary Examiner* — Kent Chang
*Assistant Examiner* — Gerald Oliver
(74) *Attorney, Agent, or Firm* — Holtz, Holtz, Goodman & Chick PC

(57) ABSTRACT

A display terminal that performs image display processing for displaying in a display section image data recorded in a recording section, which includes a controlling section that performs image sharing processing for providing image data recorded in the recording section to another display terminal over a network, acquiring image data recorded by another display terminal over the network, and displaying the acquired image data in the display section, and sharing control processing for performing control to select image data recorded by another display terminal set up at a location whose distance from the setup location of the display terminal satisfies a predetermined condition, as target image data for the image sharing processing.

21 Claims, 4 Drawing Sheets

(56) References Cited

U.S. PATENT DOCUMENTS

| | | | |
|---|---|---|---|
| 8,290,513 B2 * | 10/2012 | Forstall et al. | 455/456.3 |
| 8,332,470 B2 * | 12/2012 | Arun et al. | 709/204 |
| 8,473,200 B1 | 6/2013 | Manber et al. | |
| 2004/0224700 A1 | 11/2004 | Sawano | |
| 2006/0044401 A1 * | 3/2006 | Park | 348/207.99 |
| 2006/0216021 A1 | 9/2006 | Touchard et al. | |
| 2006/0221190 A1 * | 10/2006 | Limberis et al. | 348/207.1 |
| 2007/0076245 A1 | 4/2007 | Sugimoto et al. | |
| 2008/0155632 A1 | 6/2008 | Marilly et al. | |
| 2008/0171558 A1 * | 7/2008 | Choi et al. | 455/456.2 |
| 2010/0036834 A1 | 2/2010 | Bandas | |

FOREIGN PATENT DOCUMENTS

| | | | |
|---|---|---|---|
| CN | 101257506 A | | 9/2008 |
| CN | 101454639 A | | 6/2009 |
| JP | 2004023511 A | * 1/2004 | 455/457 |
| JP | 2006-524446 A | | 10/2006 |
| JP | 2009-099142 A | | 5/2009 |

* cited by examiner

FIG. 2

| IMAGE ID | IMAGE SHOOTING LOCATION | IMAGE PROVIDER TERMINAL SETUP LOCATION |
|---|---|---|
| 1 | A | C |
| 2 | B | D |
| ... | ... | ... |

2-1

DISPLAY TERMINAL PROVIDED WITH AN IMAGE DATA SHARING FUNCTION, IMAGE SHARING SYSTEM AND METHOD FOR SHARING IMAGE DATA

CROSS-REFERENCE TO RELATED APPLICATION

This application is based upon and claims the benefit of priority from the prior Japanese Patent Application No. 2009-227942, filed Sep. 30, 2009, the entire contents of which is incorporated herein by reference.

BACKGROUND OF THE INVENTION

1. Field of the Invention

The present invention relates to a display terminal provided with a function for sharing image data between a plurality of other display terminals, which involves an image sharing system and an image sharing method for sharing image data between a plurality of other display terminals.

2. Description of the Related Art

Conventionally, an image sharing system has been proposed that enables a plurality of users to share images (photographs) over a network, for example, Japanese Patent Application (Kohyo) Publication No. 2006-524446 (published Japanese translation of PCT/EP2004/002278 international publication) and Japanese Patent Application Laid-Open (Kokai) Publication No. 2009-099142.

In the conventional technology, in the uploading of an image from a user, the image is transmitted after preference identifying information (such as night view or people) is added thereto. Also, in the downloading of an image to a user, an image to be transmitted is selected by the server-side based on its preference identifying information.

Here, a person interested in photography may wish to receive comments on their photographs and make comments on other people's photographs. Also, this person may, at times, attempt to connect with others in real life in addition to over the network, in other words, perform activities in person (start off-line meetings or a photography club). To establish a community with real-life connection such as this, it is required that the residences of community participants are in relative proximity to one another.

However, in the above-described conventional technology, the system is a closed system on a network. Accordingly, there is a problem in that, even if a community is formed based on such services, only a virtual community on a network is established, and a community with real-life connection cannot be established.

SUMMARY OF THE INVENTION

The present invention has been conceived to solve the above-described problems. In accordance with one aspect of the present invention, there is provided a display terminal comprising: a controlling section which performs image display processing for displaying in a display section image data recorded in a recording section; image sharing processing for providing the image data recorded in the recording section to another display terminal over a network, acquiring image data recorded by another display terminal over the network, and displaying the acquired image data in the display section; and sharing control processing for performing control to select image data recorded by another display terminal set up at a location whose distance from a setup location of the display terminal satisfies a predetermined condition as target image data for the image sharing processing.

In accordance with another aspect of the present invention, there is provided an image sharing system comprising: a controlling section connected to a plurality of display terminals by a network, which (i) holds image management information where location information corresponding to each of a plurality of image data are managed by being separated into a shooting location at which each image data is captured and a setup location of a display terminal providing each image data, (ii) stores, when image data is received from any of the display terminals over the network, a setup location of a display terminal providing the image data in the image management information in association with the image data, and (iii) selects and transmits, when transmitting image data to any of the display terminals over the network, image data provided from another display terminal set up at a location whose distance from a setup location of a destination display terminal satisfies a predetermined condition, with reference to the image management information.

In accordance with another aspect of the present invention, there is provided an image sharing system for sharing an image uploaded to a server device among a plurality of terminal devices over a network, wherein the server device includes a first image delivering means for, when an image is uploaded from any of the plurality of terminal devices, setting location information indicating a setup location of a terminal device that has uploaded the image as a retrieval criterion, retrieving an image captured by a terminal device whose setup location corresponds to the location information that is the retrieval criterion from among a plurality of images that have already been uploaded, and transmitting the retrieved image to the terminal device that has performed the upload.

In accordance with another aspect of the present invention, there is provided an image sharing method for sharing an image uploaded to a server device among a plurality of terminal devices over a network, comprising: a step of adding location information indicating a setup location of a source terminal device to an image to be transmitted to the server device from any of the plurality of terminal devices; a step of, when an image is uploaded from any of the plurality of terminal devices, setting by the server device location information indicating a setup location of a terminal device that has uploaded the image as a retrieval criterion, and retrieving by the server device an image captured by a terminal device whose setup location corresponds to the location information that is the retrieval criterion from among a plurality of images that have already been uploaded; a step of transmitting by the server device the retrieved image to the terminal device that has performed the upload; and a step of receiving and storing the image transmitted from the server device by the terminal device that has performed the upload.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 2 is a conceptual diagram for describing image management information in an image storage/delivery server 2;

DETAILED DESCRIPTION OF THE PREFERRED EMBODIMENTS

A. Configuration of an Embodiment

Figure 1:
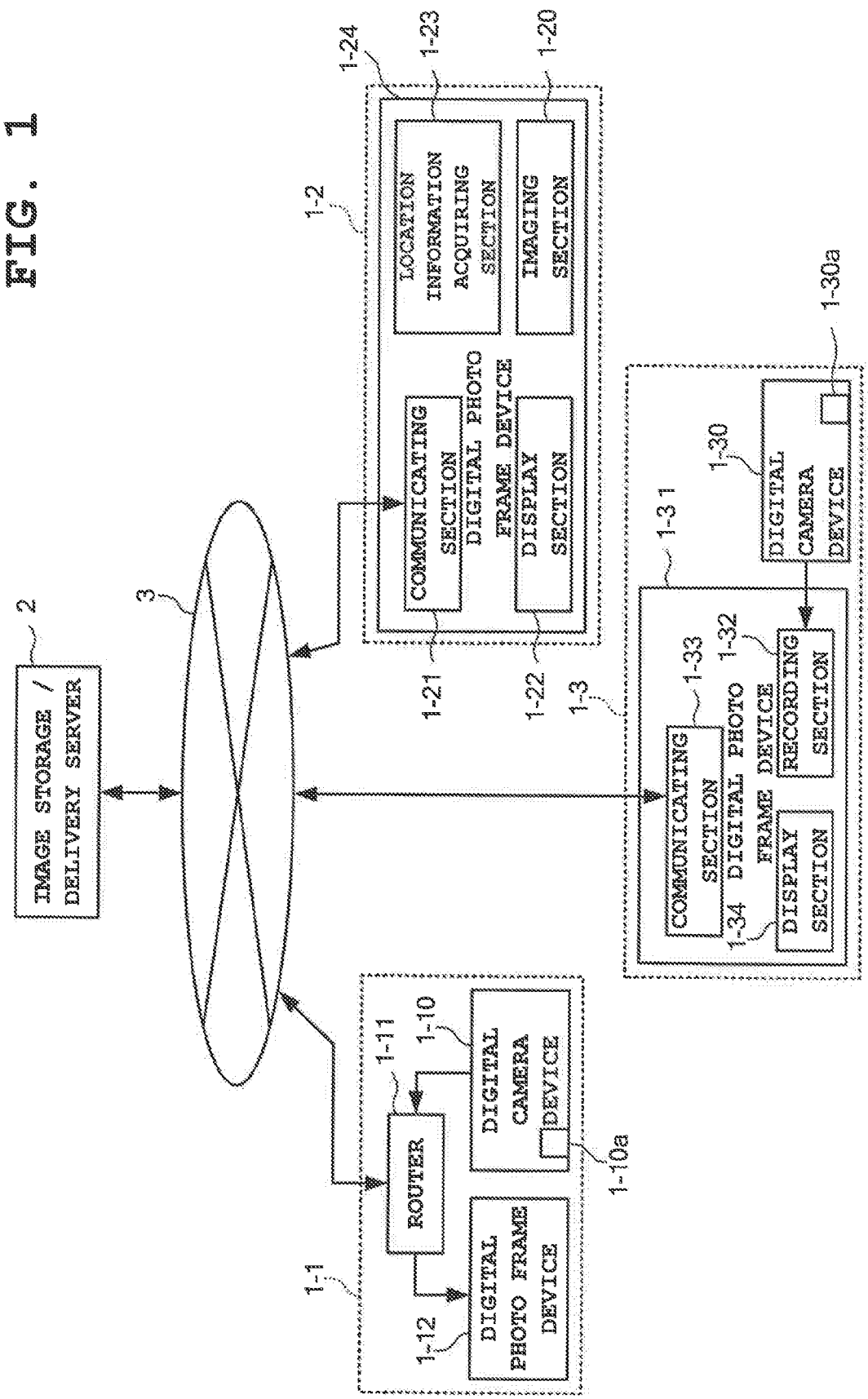
FIG. 1 is a block diagram showing a configuration of an image sharing system according to an embodiment of the present invention.

FIG. 1 is a block diagram showing a configuration of an image sharing system according to an embodiment of the present invention.

In FIG. 1, the image sharing system is structured by a plurality of display terminals 1-1 to 1-3 and an image storage/delivery server 2 being connected via a network (such as the Internet) 3. In the description hereinafter, although an example in which images (photographs) are shared will be described to simplify the explanation, the present invention is not limited thereto. The present invention is also effective for sharing moving images, etc.

The display terminals 1-1 to 1-3 may be any device, such as a personal computer, a television, a photo frame, or a mobile terminal, as long as the device includes a function for displaying an image (image display processing), a function for acquiring location information of its setup location (this may be acquired from an outside source), and a function for uploading an image over the network 3 to the image storage/delivery server 2 and downloading an image over the network 3 from the image storage/delivery server 2 (sharing control processing).

The display terminal 1-1 is constituted by a digital camera device 1-10, a router 1-11, and a digital photo frame device 1-12. The digital camera device 1-10, which includes a location information acquiring section 1-10*a*, such as a global positioning system (GPS), for acquiring its location information (longitude and latitude), adding location information (shooting location information) acquired by the location information acquiring section 1-10*a* to a captured image, and after recording the location information with the image, transferring the recorded image to the router 1-11.

The router 1-11 uploads to the image storage/delivery server 2 an image which has been captured by the digital camera device 1-10 and to which its location information (shooting location information) has been added, over the network 3. At this time, location information (setup location information indicating the setup location of the display terminal 1-1) acquired by the location information acquiring section 1-10*a* of the digital camera device 1-10 is also added to the image to be uploaded. That is, shooting location information indicating a shooting location and setup location information indicating the setup location of the display device 1-1 at the time of uploading are added to an image to be uploaded to the image storage/delivery server 2.

Also, the router 1-11 downloads an image from the image storage/delivery server 2 via the network 3. The digital photo frame device 1-12 displays an image captured by the digital camera device 1-10, and/or an image downloaded from the image storage/delivery server 2 by the router 1-11 via the network 3.

According to the description above, in the uploading of an image including location information (shooting location information) to the image storage/delivery server 2 via the network 3, setup location information is acquired by the location information acquiring section 1-10*a* of the digital camera device 1-10, and this setup location information is used as setup location information indicating the setup location of the display terminal 1-1. However, the setup location information is not limited thereto. The display terminal 1-1 itself may include a location information acquiring means, and location information acquired by the location information acquiring means may be added to the image as the setup location information indicating the setup location of the display terminal 1-1.

The display terminal 1-2 is a digital photo frame device 1-24 including an imaging section 1-20, a communicating section 1-21, a display section 1-22, and a location information acquiring section 1-23. The imaging section 1-20 includes a web camera or the like, and captures images. The communicating section 1-21 uploads an image captured by the imaging section 1-20 to the image storage/delivery server 2 and downloads an image from the image storage/delivery server 2, via the network 3.

The display section 1-22 includes a liquid crystal display, an electroluminescent (EL) display, or the like, and displays an image captured by the imaging section 1-20 and/or an image downloaded from the image storage/delivery server 2. The location information acquiring section 1-23 includes a GPS or the like, and acquires location information (setup location information indicating the setup location of the display terminal 1-2=shooting location information indicating the shooting location of a captured image). The communicating section 1-21 adds, in the uploading of an image to the image storage/delivery server 2 via the network 3, location information (setup location information=shooting location information) acquired by the location information acquiring section 1-23 to the image.

Note that, instead of the display section 1-22, an external display device such as a television may be connected, and images may be displayed on the external display device.

The display terminal 1-3 is constituted by a digital camera device 1-30 and a digital photo frame device 1-31. The digital camera device 1-30, which includes a location information acquiring section 1-30*a* for acquiring location information such as a GPS, adding location information (shooting location information) acquired by the location information acquiring section 1-30*a* to a captured image, and after recording the location information with the image, transferring the recorded image to the digital photo frame device 1-31.

The digital photo frame device 1-31 includes a recording section 1-32, a communicating section 1-33, and a display section 1-34. The recording section 1-32, which is a memory (internal or detachable) for holding images, holds an image transferred from the digital camera device 1-30, for example. The communicating section 1-33 uploads an image recorded in the recording section 1-32 or an image captured by the digital camera device 1-30 to the image storage/delivery server 2, and downloads an image from the image storage/delivery server 2, via the network 3.

The display section 1-34 includes a liquid crystal display, an EL display, or the like, and displays an image captured by the digital camera device 1-30 and/or an image downloaded from the image storage/delivery server 2 via the network 3.

The communicating section 1-33 additionally adds, in the uploading of an image which has been captured by the digital camera device 1-30 and to which its location information (shooting location information) has been added, location information (setup location information indicating the setup location of the display terminal 1-3) acquired by the location information acquiring section 1-30*a* of the digital camera device 1-30 to the image to be uploaded. That is, shooting location information indicating a shooting location and setup location information indicating the setup location of the display terminal 1-3 at the time of uploading are added to an image to be uploaded to the image storage/delivery server 2.

The digital photo frame devices 1-12, 1-24, and 1-31 include a controlling section (not shown) for controlling the overall operations of each section such as the display section, the imaging section, the communicating section, the recording section, and the location information acquiring section. The controlling section is constituted by, for example, a central processing unit (CPU) and a memory that stores a control program for controlling the CPU and working data, and the CPU actualizes various control functions by running a control program such as that shown in the flowchart in FIG. 4. A portion of the controlling section or the overall controlling section may be constituted by hardware such as an electronic circuit.

The digital photo frame devices 1-12, 1-24, and 1-31 perform image display processing for displaying in the display section image data recorded in its own recording section.

In the image display processing, if intended image data have been recorded in the recording section by a user, the controlling section selects image data to be displayed in sequence from among these plurality of image data recorded in the recording section, and displays the selected image data in the display section. Thereafter, the controlling section periodically switches image data to be displayed.

Image data to be displayed may be selected in sequence, such as in the order of recording or date, or may be selected at random. In addition, the timing at which these image data are switched may be periodic or may be random. Furthermore, the user may, in advance, register a schedule regarding the selection and switching of these image data, such as which image is displayed and at what timing the image is displayed.

The digital photo frame devices 1-12, 1-24, and 1-31 are also capable of performing image display processing for displaying image data captured by the imaging section in the display section. In this instance, after a plurality of image data captured by the imaging section are recorded and stored in the recording section, image data is read out from the recording section and displayed. Alternatively, image data sequentially captured by the imaging section may be sequentially displayed on the display section without being recorded in the recording section.

The digital photo frames 1-12, 1-24, and 1-31 are also capable of performing image display processing for displaying image data received by the communicating section in the display section. In this instance, a user clearly specifies a criterion for retrieving image data recorded in a server or another device, such as another digital photo frame, which is connected by a network. This retrieval criterion is subsequently transmitted to the other device, and the other device retrieves image data according to the retrieval criterion. The other device then transmits the retrieved image data and the communicating section receives it.

As just described, the digital photo frame devices 1-12, 1-24, and 1-31 are capable of using other devices connected by a network as its own storage device. However, in the descriptions below, the digital photo frame devices 1-12, 1-24, and 1-31 are a plurality of digital photo frames connected by a network, which are capable of performing image sharing processing for sharing image data among a plurality of digital photo frames each belonging to a different user.

In the description above, in the uploading of an image including location information (shooting location information) to the image storage/delivery server 2 via the network 3, location information acquired by the location information acquiring section 1-30*a* of the digital camera device 1-30 serves as setup location information indicating the setup location of the display terminal 1-3. However, the location information is not limited thereto. The digital photo frame device 1-31 itself may include a location information acquiring means, and location information acquired by the location information acquiring means may be added to the image as the setup location information indicating the setup location of the display terminal 1-3.

The image storage/delivery server 2 includes a function for, when images to which shooting location information and setup location information have been added are transmitted from the display terminals 1-1 to 1-3, associating identifying information for identifying these images with each received image, and storing the shooting location information of the images and the setup location information of the transmission source (display terminal), and a function for, based on the setup location information of the transmission source of these images and/or the shooting location information of these images, selecting a related image or the like and sending the image back to the display terminal 1-1 to 1-3 which is the transmission source.

More specifically, this related image is selected by the four retrieval methods described below.

(1) an image of which the shooting location is near or in the same area (described in detail hereafter) is retrieved, with the shooting location of the uploaded image as the location criterion for retrieval;

(2) an image of which the setup location of the display terminal is near or in the same area (described in detail hereafter) is retrieved, with the shooting location of the uploaded image as the location criterion for retrieval;

(3) an image of which the shooting location is near or in the same area (described in detail hereafter) is retrieved, with the setup location of the display terminal as the location criterion for retrieval; and (4) an image of which the setup location of the display terminal is near or in the same area (described in detail hereafter) is retrieved, with the setup location of the display terminal as the location criterion for retrieval.

In the above-described configuration, the image storage/delivery server 2 side is capable of recognizing the transmission and reception of images with the same device or device group by matching a transmission address (or identification [ID] and the like) used in the transmission of an image from the display terminal 1-1 to 1-3 to the image storage/delivery server 2 and a reception address (or ID and the like) used in the transmission of an image from the image storage/delivery server 2 to the display terminal 1-1 to 1-3. Accordingly, the display terminals 1-1 to 1-3 may be configured such that the functions are spread and assigned to a plurality of devices, or that all the functions are assigned to a single device. In addition, even mobile devices can be supported through the use of an ID entered by a user.

In the description above, shooting location information and setup location information are geographical information, such as longitude and latitude, acquired by the location information acquiring sections 1-10*a*, 1-23, and 1-30*a* of the display terminals 1-1 to 1-3 using a GPS. However, these shooting location information and setup location information are not limited thereto and may, for example, be a postal code entered by a user, instead of information acquired using the GPS.

FIG. 2 is a conceptual diagram for describing image management information in the image storage/delivery server 2. The image storage/delivery server 2 performs the transmission and reception of images with a plurality of display terminals 1-1 to 1-3 via the network 3. Accordingly, as shown in FIG. 2, the image storage/delivery server 2 holds, for each image ID identifying an image, an image management information table 2-1 for managing the shooting location of an image and the setup location of the display terminal 1-1 to 1-3 providing (uploading) the image.

In the example in FIG. 2, shooting location "A" of an image and setup location "C" of the display terminal have been stored in association with image ID "1", and shooting location "B" of an image and setup location "D" of the display terminal have been stored in association with an image ID "2". Note that, when the location information acquiring means of the display terminals 1-1 to 1-3 is a GPS, the shooting location and the setup location are geographical information such as longitude and latitude. However, the location information acquiring means may acquire information other than that acquired using GPS, such as a postal code.

The image storage/delivery server 2 includes a controlling section (not shown) for controlling the various operations. The controlling section is constituted by, for example, a CPU and a memory that stores a control program for controlling the CPU and working data, and the CPU actualizes various control functions by running a control program such as that shown in the flowchart in FIG. 3. A portion of the controlling section or the overall controlling section may be constituted by hardware such as an electronic circuit.

B. Operations of the Embodiment

Next, operations of the embodiment will be described.

Figure 3:
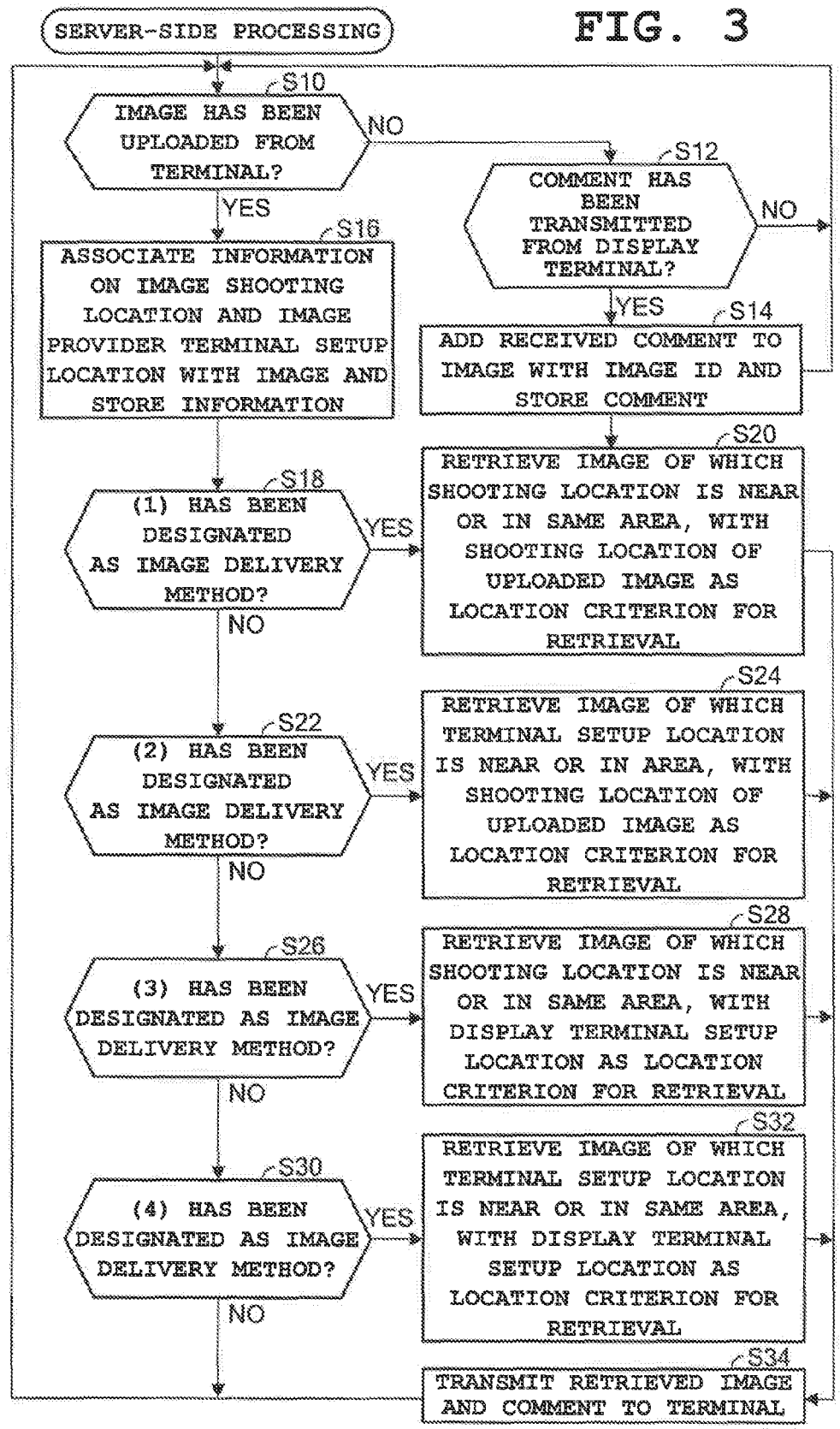
FIG. 3 is a flowchart for describing operations of the image storage/delivery server 2 according to the embodiment.

FIG. 3 is a flowchart for describing operations performed by the image storage/delivery server 2 of the embodiment. The controlling section of the image storage/delivery server 2 first judges whether or not a display terminal 1-$i$ ($i$=1 to 3) has uploaded an image (Step S10). When judged that an image has not been uploaded, the controlling section judges whether or not the display terminal 1-$i$ has transmitted a comment (Step S12).

This comment is for information exchange, communication, and the like between users, and by the addition of a comment to an image, simple communication can be performed with another user sharing the image. Also, this comment is entered by a later-described operation performed by the display terminal when the display terminal 1-$i$ receives an image from the image storage/delivery server 2, and is transmitted to the image storage/delivery server 2 with an image ID for identifying the received image. When judged that a comment has not been transmitted, the controlling section returns to Step S10 and waits until an image is uploaded.

Conversely, when judged that the display terminal 1-$i$ has transmitted a comment, the controlling section adds the received comment to an image corresponding to the image ID, and after storing the comment (Step S14), returns to Step S10 and waits until an image is uploaded.

On the other hand, when judged that the display terminal 1-$i$ ($i$=1 to 3) has uploaded an image, the controlling section associates, in accordance with shooting location information and setup location information added to the image, the image shooting location and the setup location of the image provider terminal with the image, and stores them in the image management information table 2-1 (Step S16).

Next, the controlling section of the image storage/delivery server 2 judges whether or not the above-described retrieval method (1) has been designated as the image delivery method (Step S18). This designation of the image delivery method may be performed such that designation information is received from the display terminal 1-1 to 1-3 every time an image is uploaded. Alternatively, designation information of the image delivery method received from each display terminal 1-1 to 1-3 at an intended timing may be set and stored for each display terminal 1-1 to 1-3. Alternatively, the same image distribution method may be set and stored for all display terminals 1-1 to 1-3.

When judged that the above-described retrieval method (1) has been designated, the controlling section retrieves an image of which the shooting location is near or in the same area from among a plurality of stored images, with the shooting location of the uploaded image as the location criterion for the retrieval (Step S20), and after transmitting the retrieved image and comment to the relevant display terminal 1-$i$ (Step S34), returns to Step S10.

Here, the judgment of whether or not the shooting location is near is made based on, for example, whether or not the distance is within a range specified in advance. Also, the judgment of whether or not the shooting location is in the same area is made based on, for example, whether or not the location belongs to the same area at a level specified in advance, such as a street, a city, a prefecture, or a country, with reference to map data. Alternatively, an intended distance or area size may be specified as the judgment criterion.

In this instance, an image from another person which has been captured near or in the same area as the shooting location of the uploaded image is transmitted to the display terminal 1-$i$ that has uploaded the image. That is, the user of the display terminal 1-$i$ that has uploaded the image shares an image from another person which has been captured near or in the same area as the location where the user has performed the capturing.

Conversely, when judged that the above-described retrieval method (1) has not been designated, the controlling section judges whether or not the above-described retrieval method (2) has been designated as the image delivery method (Step S22). when judged that the above-described retrieval method (2) has been designated, the controlling section retrieves an image of which the setup location of the display terminal is near or in the same area, with the shooting location of the uploaded image as the location criterion for the retrieval (Step S24), and after transmitting the retrieved image to the relevant display terminal 1-$i$ (Step S34), returns to Step S10.

In this instance, an image captured by another person present near or in the same area as the shooting location of the uploaded image is transmitted to the display terminal 1-$i$ that has uploaded the image. That is, the user of the display terminal 1-$i$ that has uploaded the image shares an image captured by another person present near or in the same area as the location where the user has performed the capturing.

Conversely, when judged that the above-described retrieval method (2) has not been designated, the controlling section judges whether or not the above-described retrieval method (3) has been designated as the image delivery method (Step S26). When judged that the above-described retrieval method (3) has been designated, the controlling section retrieves an image of which the shooting location is near or in the same area, with the setup location of the display terminal 1-$i$ as the location criterion for the retrieval (Step S28), and after transmitting the retrieved image to the relevant display terminal 1-$i$ (Step S34), returns to Step S10.

In this instance, an image captured by another person present near or in the same area as the setup location where the display terminal 1-$i$ has been set-up is transmitted to the display terminal 1-$i$ that has uploaded the image. That is, the user of the display terminal 1-$i$ that has uploaded the image shares an image captured by another person present near or in the same area as the location where the user is present.

When judged that the above-described retrieval method (3) has not been designated, the controlling section judges whether or not the above-described retrieval method (4) has been designated as the image delivery method (Step S30). When judged that the above-described retrieval method (4) has been designated, the controlling section retrieves an image of which the setup location of its display terminal 1-*j* (other than i) is near or in the same area, with the setup location of the display terminal 1-*i* as the location criterion for the retrieval (Step S32), and after transmitting the retrieved image to the relevant display terminal 1-*i* (Step S34), returns to Step S10.

In this instance, an image captured by another person present near or in the same area as the setup location of the display terminal 1-*i* is transmitted to the display terminal 1-*i*. That is, the user of the display terminal 1-*i* that has uploaded the image shares an image captured by another person present near or in the same area as the location where the user is present.

Figure 4:
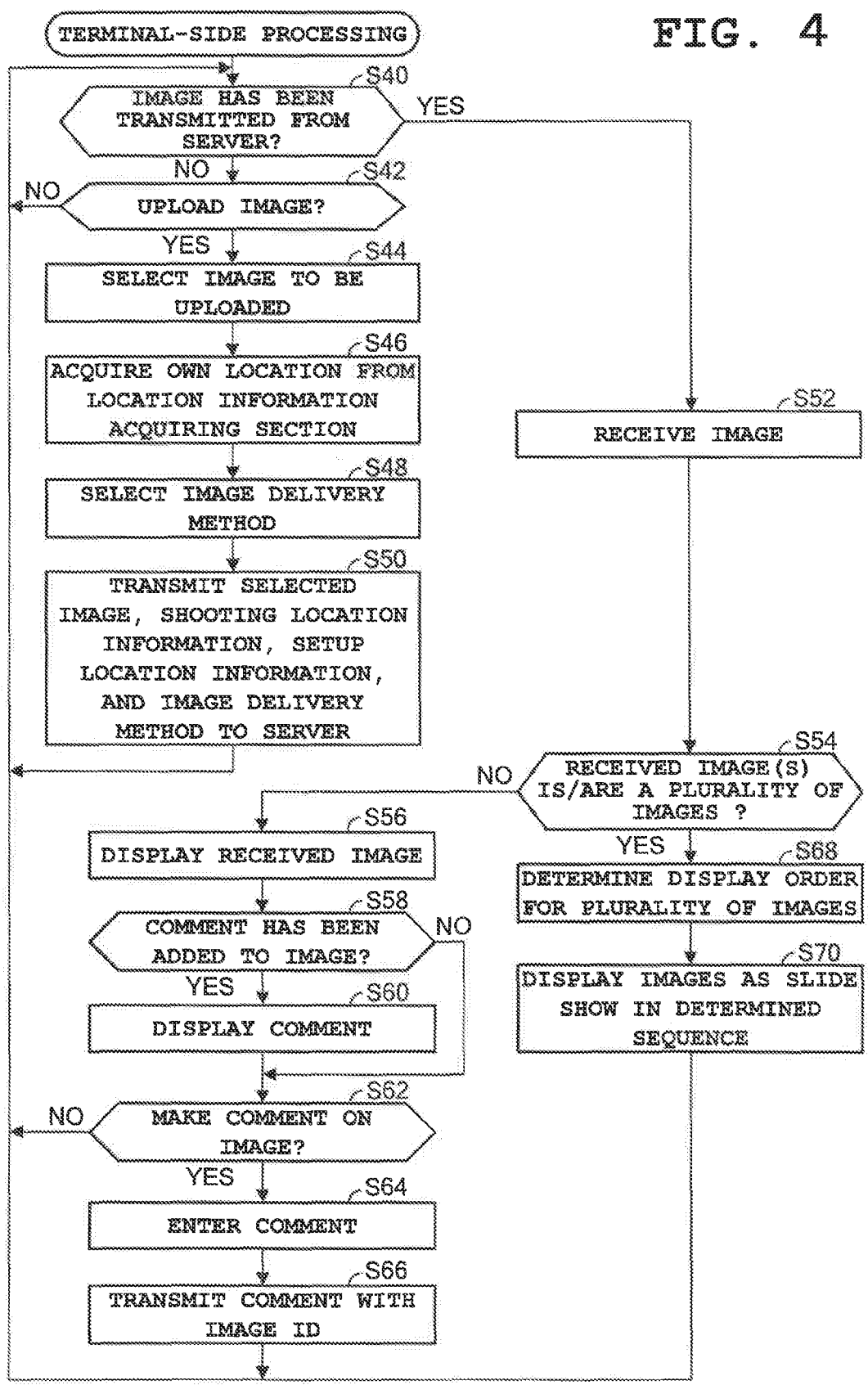
FIG. 4 is a flowchart for describing operations of display terminals 1-1 to 1-3 according to the embodiment.

Next, FIG. 4 is a flowchart for describing operations performed by the display terminal 1-1 to 1-3 of the embodiment.

Firstly, each controlling section of the display terminals 1-*i* (i=1 to 3) judges whether or not the image storage/delivery server 2 has transmitted an image (Step S40). When judged that an image has not been transmitted, the controlling section determines whether or not to upload an image from the display terminal 1-*i* itself (judges whether or not the user has performed an uploading operation) (Step S42). When a determination not to upload an image from the display terminal 1-*i* itself is made (when judged that the user has not performed an uploading operation), the controlling section returns to Step S40 without any action.

Conversely, when a determination to upload an image from the display terminal 1-*i* itself is made (when judged that the user has performed an uploading operation), the controlling section selects an image to be uploaded (Step S44). This selection is made by a list of images stored in a predetermined recording medium being displayed and the user selecting an image. Next, the controlling section acquires a current location (setup location) from the location information acquiring section 1-10*a*, 1-23, or 1-30*a* (Step S46), and prompts the selection of an image delivery method indicated by the above-described retrieval methods (1) to (4) (Step S48). Subsequently, the controlling section transmits the selected image, the shooting location information, the setup location information, and the image delivery method to the transmission image storage/delivery server 2 (Step S50), and then returns to Step S40.

As a result, the image from the display terminal 1-*i* is stored in the image storage/delivery server 2 in association with the shooting location information, the setup location information, and the image delivery method, and an image retrieved in accordance with the image delivery method is transmitted to the display terminal 1-*i*, as described above.

Conversely, when judged that the image storage/delivery server 2 has transmitted an image at Step S40, the controlling section receives image(s) retrieved in accordance with an image delivery method (Step S52), and judges whether or not the received image(s) is/are a plurality of images (Step S54). When judged that the received image(s) is/are not a plurality of images but one image, the controlling section displays the received image (Step S56).

Next, the controlling section judges whether or not a comment has been added to the received image (Step S58). When judged that a comment has been added, the controlling section displays the comment (Step S60). Then, the controlling section judges whether or not to make a comment regarding the image (Step S62). When an instruction not to make any comment is given from the user, the controlling section immediately returns to Step S40.

Conversely, when an instruction to make a comment is given from a user, the controlling section prompts the user to enter a comment (Step S64), and after transmitting the entered comment with an image ID identifying the received image to the image storage/delivery server 2 (Step S66), returns to Step S40. In this way, as a result of the transmission and reception of comments associated with an image, simple communication can be performed.

Conversely, when judged that the received image(s) is/are a plurality of images at Step S54, the controlling section determines a display order for this plurality of images (Step S68), and after displaying the received plurality of images as a slide show in the determined order (Step S70), returns to Step S40.

According to the above-described embodiment, images are shared among users having a commonality in the setup locations of the display terminals 1-1 to 1-3, the shooting locations of images, etc. These users who are sharing an image are likely to have captured similar scenery at locations close to each other or in the same area, or captured scenery at a location known to both users. Also, there is a high possibility that they live close to each other. Accordingly, since they are likely to have similar or the same tastes and preferences, or may be present in relative proximity, their sense of community is encouraged. This serves as motivation to hear comments on one's own photographs, to make comments on another person's photograph, and to meet in person for performing activities of some sort, which triggers the establishment of a real-life community. As a result, a real-life community is readily established in actuality.

Note that, in the above-described embodiment, preference information indicating the preference of a user may be transmitted in addition to an image, shooting location information, and setup location information, as information transmitted by the display terminal 1-1 to 1-3 to the image storage/delivery server 2. This user preference indicates what kind of images (photographs) the user is interested in.

For example, if a user who does not shoot photographs of trains (does not transmit photographs of trains) himself is interested in photographs of trains captured by other people, preference information indicating an interest in photographs of trains may be added to an image and transmitted to the image storage/delivery server 2. The image storage/delivery server 2 manages the preference information related to the user's preference, and extracts and transmits images based on the preference information in addition to the shooting location information and the setup location information. As a result, the user can acquire an intended image without transmitting this kind of image himself, whereby he can become acquainted with other users having the same interest.

Also, in the embodiment, shooting location information and setup location information are information indicating geographical location. However, they are not limited thereto, and may be a country (such as Japan, United States, or France), a region (such as Tohoku, Kanto, or Kyushu), a railway line (such as ○○ Line or ΔΔ Line), a train station (such as ○○ Station, ΔΔ station, or □□ Station), a school or landmark (such as ○○ Elementary School, ΔΔ Junior High School, □□ Building, or xx Park), a sports club (such as a soccer club or a swimming club), or a combination thereof.

Moreover, in the above-described embodiment, the image storage/delivery server 2 transmits a corresponding image immediately after the display terminal 1-1 to 1-3 uploads an image. However, this is not limited thereto. For example, the image storage/delivery server 2 may deliver an image or an image list (if it is a plurality of images) selected in accordance with an image delivery method after a predetermined amount of time has elapsed since an image is uploaded by the display terminal 1-1 to 1-3.

Furthermore, when judged that a plurality of images have been received from the image storage/delivery server 2, the display terminal 1-1 to 1-3 displays the images as a slide show. However, the display method is not limited to a slide show. For example, this plurality of images may be displayed as thumbnail images, and an image selected by the user may be displayed.

While the present invention has been described with reference to the preferred embodiments, it is intended that the invention be not limited by any of the details of the description therein but includes all the embodiments which fall within the scope of the appended claims.

What is claimed is:

1. A display terminal comprising:
    a controlling section which performs:
        (i) image display processing for displaying in a display section image data recorded in a recording section;
        (ii) image sharing processing for providing the image data recorded in the recording section to another display terminal over a network, acquiring image data recorded by another display terminal over the network, and displaying the acquired image data in the display section; and
        (iii) sharing control processing for performing control to select image data recorded by another display terminal present at a location whose distance from a current location of the display terminal satisfies a predetermined condition as target image data for the image sharing processing;
    wherein:
        two pieces of location information are separately stored and managed for each image data, the two pieces of location information including information regarding a shooting location at which the image data was captured and a providing location of a display terminal providing the image data at a time at which the image data was provided; and
        the sharing control processing uses the providing location among the two pieces of location information associated image data, and selects target image data for the image sharing processing based on a distance between the providing location and the current location of the display terminal.

2. The display terminal according to claim 1, wherein the sharing control processing allows one of the shooting location and the providing location to be arbitrarily selected as a selection condition when selection of target image data for the image sharing processing is made.

3. The display terminal according to claim 2, wherein the sharing control processing allows selection of image data that is recorded by another display terminal after being captured at a location whose distance from the current location of the display terminal satisfies a predetermined condition, as target image data for the image sharing processing.

4. The display terminal according to claim 2, wherein the sharing control processing allows selection of image data that is recorded by another display terminal present at a location whose distance from a shooting location of the image data that has been provided by the display terminal satisfies a predetermined condition, as target image data for the image sharing processing.

5. The display terminal according to claim 2, wherein the sharing control processing allows selection of image data that is recorded by another display terminal after being captured at a location whose distance from a shooting location of the image data that has been provided by the display terminal satisfies a predetermined condition, as target image data for the image sharing processing.

6. The display terminal according to claim 1, wherein the image sharing processing adds, when providing the image data recorded in the recording section to another display terminal over the network, the two pieces of location information to the image data, and uploads the image data.

7. The display terminal according to claim 1, wherein the display terminal is configured such that, in a case in which a comment has been added to the target image data for the image sharing processing, the comment is displayed together with the target image data.

8. The display terminal according to claim 7, wherein the display terminal is configured such that, when a comment is entered while the target image data for the image sharing processing is being displayed, the comment is added to the target image data.

9. A server device comprising:
    a controlling section connected to a plurality of display terminals by a network, which (i) holds image management information in which two pieces of location information are separately stored and managed for each of a plurality of image data, the two pieces of location information including information regarding a shooting location at which the image data was captured and a providing location of a display terminal providing the image data at a time at which the image data was provided, (ii) stores, when image data is received from any of the display terminals over the network, a providing location of a display terminal providing the image data at a time at which the image data is provided in the image management information in association with the image data, and (iii) selects and transmits, when transmitting image data to any of the display terminals over the network, image data provided from another display terminal set up present at a location whose distance from a current location of a destination display terminal satisfies a predetermined condition, with reference to the image management information;
    wherein the controlling section uses the providing location among the two pieces of location information in association with image data, and selects target image data for transmission to the destination display terminal based on a distance between the providing location and the current location of the destination display terminal.

10. An image sharing system for sharing an image uploaded to a server device among a plurality of terminal devices over a network, wherein the server device includes a first image delivering section which, when an image is uploaded from any of the plurality of terminal devices, sets terminal location information indicating a terminal location of a terminal device that has uploaded the image as a retrieval criterion, retrieves an image captured by another terminal device whose location corresponds to the terminal location information that is the retrieval criterion from among a plurality of images that have already been uploaded, and transmits the retrieved image to the terminal device that has performed the upload;
    wherein:
        two pieces of location information are separately stored and managed for each image, the two pieces of location information including information regarding a shooting location at which the image was captured and a providing location of a terminal device providing the image at a time at which the image was provided; and the first image delivering section uses the providing location among the two pieces of location information in association with an image, and judges whether or not to transmit the retrieved image to the terminal device based on a distance between the providing location and the terminal location of the terminal device.

11. The image sharing system according to claim 10, wherein the server device further includes (i) a second image delivering section which, when an image is uploaded from any of the plurality of terminal devices, sets terminal location information indicating a terminal location of a terminal device that has uploaded the image as a retrieval criterion, retrieves an image whose shooting location corresponds to the terminal location information that is the retrieval criterion from among a plurality of images that have already been uploaded, and transmits the retrieved image to the terminal device that has performed the upload, and (ii) a delivery selecting section which selects one of the first image delivering section and the second image delivering section, and delivers the image in accordance with a designation from the terminal device that has performed the upload.

12. The image sharing system according to claim 11, wherein the server device further includes a shooting location information managing section which stores and manages the information regarding the shooting location of the image in association with each of a plurality of images uploaded from the plurality of terminal devices.

13. The image sharing system according to claim 12, wherein the server device further includes a third image delivering section which, when an image is uploaded from any of the plurality of terminal devices, sets shooting location information indicating a shooting location of the uploaded image as a retrieval criterion, retrieves an image captured by a terminal device whose location corresponds to the shooting location information that is the retrieval criterion from among a plurality of images that have already been uploaded, and transmits the retrieved image to the terminal device that has performed the upload, and wherein the delivery selecting section selects one of the first image delivering section, the second image delivering section, and the third image delivering section, and delivers the image in accordance with a designation from the terminal device that has performed the upload.

14. The image sharing system according to claim 13, wherein the third image delivering section specifies, when specifying a terminal device whose location corresponds to the shooting location information that is the retrieval criterion, a terminal device present within an area whose distance from a shooting location indicated by the shooting location information that is the retrieval criterion has been specified in advance, or a terminal device present in a same area as an area indicated by the shooting location information that is the retrieval criterion.

15. The image sharing system according to claim 13, wherein the server device further includes a fourth image delivering section which, when an image is uploaded from any of the plurality of terminal devices, sets shooting location information indicating a shooting location of the uploaded image as a retrieval criterion, retrieves an image whose shooting location corresponds to the shooting location information that is the retrieval criterion from among a plurality of images that have already been uploaded, and transmits the retrieved image to the terminal device that has performed the upload, and wherein the delivery selecting section selects any one of the first image delivering section, the second image delivering section, the third image delivering section, and the fourth image delivering section, and delivers the image in accordance with a designation from the terminal device that has performed the upload.

16. The image sharing system according to claim 15, wherein the fourth image delivering section specifies, when specifying an image whose shooting location corresponds to the shooting location information that is the retrieval criterion, an image captured within an area whose distance from a shooting location indicated by the shooting location information that is the retrieval criterion has been specified in advance, or an image captured in a same area as an area indicated by the shooting location information that is the retrieval criterion.

17. The image sharing system according to claim 11, wherein the server device further includes a fourth image delivering section which, when an image is uploaded from any of the plurality of terminal devices, sets shooting location information indicating a shooting location of the uploaded image as a retrieval criterion, retrieves an image whose shooting location corresponds to the shooting location information that is the retrieval criterion from among a plurality of images that have already been uploaded, and transmits the retrieved image to the terminal device that has performed the upload, and wherein the delivery selecting section selects any one of the first image delivering section, the second image delivering section, the third image delivering section, and the fourth image delivering section, and delivers the image in accordance with a designation from the terminal device that has performed the upload.

18. The image sharing system according to claim 17, wherein the fourth image delivering section specifies, when specifying an image whose shooting location corresponds to the shooting location information that is the retrieval criterion, an image captured within an area whose distance from a shooting location indicated by the shooting location information that is the retrieval criterion has been specified in advance, or an image captured in a same area as an area indicated by the shooting location information that is the retrieval criterion.

19. The image sharing system according to claim 11, wherein the second image delivering section specifies, when specifying an image whose shooting location corresponds to the terminal location information that is the retrieval criterion, an image captured within an area whose distance from a terminal location indicated by the terminal location information that is the retrieval criterion has been specified in advance, or an image captured in a same area as an area indicated by the terminal location information that is the retrieval criterion.

20. The image sharing system according to claim 10, wherein the first image delivering section specifies, when specifying a terminal device whose location corresponds to the terminal location information that is the retrieval criterion, a terminal device present within an area whose distance from a terminal location indicated by the terminal location information that is the retrieval criterion has been specified in advance, or a terminal device present in a same area as an area indicated by the terminal location information that is the retrieval criterion.

21. An image sharing method for sharing an image uploaded to a server device among a plurality of terminal devices over a network, the method comprising:

when an image is transmitted from any of the plurality of terminal devices to the server device, adding providing location information to the image, the providing location information indicating a location of the terminal device at a time at which the terminal device transmitted the image to the server device;

when an image is uploaded from any of the plurality of terminal devices, setting by the server device terminal location information indicating a terminal location of a terminal device that has uploaded the image as a retrieval criterion, and retrieving by the server device an image captured by a terminal device whose location corresponds to the terminal location information that is the retrieval criterion from among a plurality of images that have already been uploaded;

transmitting by the server device the retrieved image to the terminal device that has performed the upload; and receiving and storing the image transmitted from the server device by the terminal device that has performed the upload;

wherein two pieces of location information are separately stored and managed for each image, the two pieces of location information including information regarding a shooting location at which the image was captured and the providing location information; and wherein the transmitting comprises using the providing location among the two pieces of location information in association with an image, and judging whether or not to transmit the retrieved image to the terminal device based on a distance between the providing location and the terminal location of the terminal device.

* * * * *

UNITED STATES PATENT AND TRADEMARK OFFICE
CERTIFICATE OF CORRECTION

PATENT NO.       : 9,092,185 B2
APPLICATION NO.  : 12/893011
DATED            : July 28, 2015
INVENTOR(S)      : Kimiyasu Mizuno et al.

Page 1 of 1

It is certified that error appears in the above-identified patent and that said Letters Patent is hereby corrected as shown below:

IN THE CLAIMS

Column 12, claim 9, line 39-40, delete "terminal set up" and insert --terminal--.

Signed and Sealed this
Sixteenth Day of February, 2016

Michelle K. Lee
*Director of the United States Patent and Trademark Office*